(12) United States Patent
Wang (10) Patent No.: US 7,783,140 B2
(45) Date of Patent: Aug. 24, 2010

(54) OPTICALLY COUPLED INTEGRATED CIRCUIT LAYERS

(75) Inventor: Shih-Yuan Wang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1143 days.

(21) Appl. No.: 11/148,583

(22) Filed: Jun. 9, 2005

(65) Prior Publication Data

US 2006/0280504 A1    Dec. 14, 2006

(51) Int. Cl.
G02B 6/12 (2006.01)
G02B 6/42 (2006.01)
G02B 6/32 (2006.01)

(52) U.S. Cl. ............ 385/14; 385/31; 385/33
(58) Field of Classification Search ........... 385/14, 385/31, 33
See application file for complete search history.

(56) References Cited

U.S. PATENT DOCUMENTS

| | | | |
|---|---|---|---|
| 5,583,609 A * | 12/1996 | Mizutani et al. ........... 355/46 |
| 5,757,758 A * | 5/1998 | Yagi et al. ............ 369/112.25 |
| 5,771,085 A * | 6/1998 | Ochi et al. ................ 349/158 |
| 5,835,458 A * | 11/1998 | Bischel et al. ........... 369/44.12 |
| 5,850,276 A * | 12/1998 | Ochi et al. ................ 349/158 |
| 5,986,996 A * | 11/1999 | Kitamura et al. ...... 369/112.16 |
| 6,072,956 A * | 6/2000 | Hamada et al. ............. 396/104 |
| 6,185,176 B1 * | 2/2001 | Sugiura et al. .......... 369/112.1 |
| 6,243,508 B1 * | 6/2001 | Jewell et al. .................. 385/14 |
| 6,845,184 B1 | 1/2005 | Yoshimura et al. |
| 6,882,051 B2 | 4/2005 | Majumdar et al. |
| 7,099,264 B2 * | 8/2006 | Fukaya et al. .............. 369/284 |
| 2001/0030740 A1 * | 10/2001 | Mori et al. .................. 355/53 |
| 2002/0080323 A1 * | 6/2002 | Muroya ...................... 349/187 |
| 2003/0075816 A1 * | 4/2003 | Buazza ..................... 264/1.36 |
| 2003/0183960 A1 * | 10/2003 | Buazza et al. ............. 264/1.38 |
| 2003/0198493 A1 | 10/2003 | Hiramatsu |
| 2003/0201462 A1 * | 10/2003 | Pommer et al. ............ 257/200 |
| 2003/0228759 A1 * | 12/2003 | Uehara et al. .............. 438/689 |
| 2004/0022164 A1 * | 2/2004 | Nishioka et al. ....... 369/112.05 |
| 2004/0047272 A1 * | 3/2004 | Fukaya et al. ......... 369/112.25 |
| 2004/0213307 A1 | 10/2004 | Lieber et al. |
| 2005/0078902 A1 | 4/2005 | Beausoleil et al. |
| 2005/0191774 A1 * | 9/2005 | Li et al. ...................... 438/22 |
| 2005/0233493 A1 * | 10/2005 | Augusto .................... 438/51 |
| 2006/0164954 A1 * | 7/2006 | Hashimura ............. 369/112.01 |

(Continued)

FOREIGN PATENT DOCUMENTS

EP        0463390        3/2004

(Continued)

OTHER PUBLICATIONS

Fiore, A., et. al., "Scaling quantum-dot light-emitting diodes to submicrometer sizes," Appl. Phys. Lett., vol. 81, No. 10, 1756-8 (Sep. 2, 2002).

(Continued)

*Primary Examiner*—K. Cyrus Kianni (57) ABSTRACT

In an optoelectronic integrated circuit device comprising a vertical arrangement of integrated circuit layers, an optical signal is coupled between a first integrated circuit layer thereof and a second integrated circuit layer thereof. The optical signal is projected through a superlensing element positioned between the first and second integrated circuit layers.

37 Claims, 5 Drawing Sheets

U.S. PATENT DOCUMENTS

2006/0280504 A1* 12/2006 Wang .......................... 398/138
2007/0297710 A1* 12/2007 Suzuki .......................... 385/8
2008/0291140 A1* 11/2008 Kent et al. .................... 345/83

FOREIGN PATENT DOCUMENTS

| WO | WO03/044897 | 5/2003 |
| WO | WO03/088419 | 10/2003 |
| WO | WO2004/020186 | 3/2004 |

OTHER PUBLICATIONS

Painter, O., et. al., "Lithographic Tuning of a Two-Dimensional Photonic Crystal Laser Array," IEEE Phot. Tech. Lett., vol. 12, No. 9, 1126-8 (Sep. 2000).

Liu, L., et. al., "Near-field optical storage system using a solid immersion lens with a left-handed material slab," Optics Express, vol. 12, No. 20, 4835-40 (Oct. 4, 2004).

Fang, N. et. al., "Sub—Diffraction-Limited Optical Imaging with a Silver Superlens," Science, vol. 308, 534-7 (Apr. 22, 2005).

Srituravanich, et. al., "Sub-100 nm lithography using ultrashort wavelength of surface plasmons," J. Vac. Sci. Technol. B 22(6), 3475-8 (Nov./Dec. 2004).

Pendry J B—"Negative Refraction Makes a Perfect Lens"—Physical Review Letters vol. 85 No. 18—Oct. 30, 2000—pp. 3966-3969.

Melville D.O.S et al—"Super-Resolution Imaging Through a Planar Silver Layer"—Optics Express vol. 13 No. 6—Mar. 12, 2005—pp. 2127-2133.

Blaikie R. J. et al—"Imaging Through Planar Silver Lenses in the Optical Near Field"—Journal of Optics A: Pure and Applied Optics vol. 7 No. 2—Feb. 2005—pp. 176-183.

\* cited by examiner

OPTICALLY COUPLED INTEGRATED CIRCUIT LAYERS

FIELD

This patent specification relates to coupling signals between different integrated circuit layers of an integrated circuit device.

BACKGROUND

Integrated circuit devices have become essential components in a wide variety of products ranging from computers and robotic devices to household appliances and automobile control systems. New applications continue to be found as integrated circuit devices become increasingly capable and fast while continuing to shrink in physical size and power consumption. As used herein, integrated circuit device refers broadly to a device having one or more integrated circuit chips performing at least one electrical and/or optical function, and includes both single-chip and multi-chip devices. In multi-chip devices, each integrated circuit chip is usually separately fabricated or "built up" from a substrate, and the resultant chips are bonded together or otherwise coupled into a common physical arrangement.

Advances in integrated circuit technology continue toward reducing the size of electrical circuits to smaller and smaller sizes, such that an entire local electrical circuit (e.g., a group of memory cells, a shift register, an adder, etc.) can be reduced to the order of hundreds of nanometers in linear dimension, and eventually even to tens of nanometers or less. At these physical scales and in view of ever-increasing clock rates, limitations arise in the data rates achievable between different parts of the integrated circuit device, with local electrical circuits having difficulty communicating with "distant" electrical circuits over electrical interconnection lines that may be only a few hundred or a few thousand microns long.

To address these issues, proposals have been made for optically interconnecting different electrical circuits in an integrated circuit device. For example, in the commonly assigned U.S. 2005/0078902A1, a photonic interconnect system is described that avoids high capacitance electric interconnects by using optical signals to communicate data between devices.

One issue that arises in the context of these and other electrooptical devices relates to the vertical transfer of optical signals between different integrated circuit layers. For example, in a multi-chip photonic interconnect system, it is often desirable to optically transfer information between a top-facing integrated circuit layer of a first chip and a bottom-facing integrated circuit layer of a second chip placed atop the first chip. The first chip may contain dense electrical circuits, for example, while the second chip may contain waveguides, optical couplers, etc. for transferring the information to "distant" components. In another example, it may be desirable to optically transfer information between two different integrated circuit layers of the same integrated circuit chip.

As device sizes continue to decrease, one issue arises when multiple adjacent optical signals require coupling between a first integrated circuit layer and a second integrated circuit layer, the optical signals being emitted at closely spaced locations. For example, it may be desirable to closely space the emitting locations for correspondence with closely spaced local electrical circuits for which information is being optically transferred. Issues can also arise for the case of a single optical signal emitted from a single location on the first integrated layer, including horizontal signal leakage issues (which can increase ambient optical "noise" in the system) and/or coupling efficiency issues. Other issues arise as would be apparent to one skilled in the art upon reading the present disclosure.

SUMMARY

In one embodiment, in an optoelectronic integrated circuit device comprising a vertical arrangement of integrated circuit layers, a method for coupling an optical signal between a first integrated circuit layer thereof and a second integrated circuit layer thereof is provided. The optical signal is projected through a superlensing element positioned between the first and second integrated circuit layers.

Also provided is an integrated circuit device, comprising a first integrated circuit layer and a second integrated circuit layer. The first integrated circuit layer has a first surface including an emitting aperture, and the second integrated circuit layer has a second surface facing the first surface, the second surface including a receiving aperture. A superlensing element is positioned between the first and second surfaces such that an optical signal emitted at the emitting aperture is imaged onto the receiving aperture.

Also provided is an apparatus comprising a first integrated circuit layer having a first surface including a first emitting aperture from which a first optical signal is emitted. The apparatus further comprises a second integrated circuit layer having a second surface facing the first surface, the second surface including a first receiving aperture. The apparatus further comprises means for sub-wavelength imaging of the first emitting aperture onto the first receiving aperture such the first optical signal is received at the first receiving aperture.

DETAILED DESCRIPTION

Figure 1:
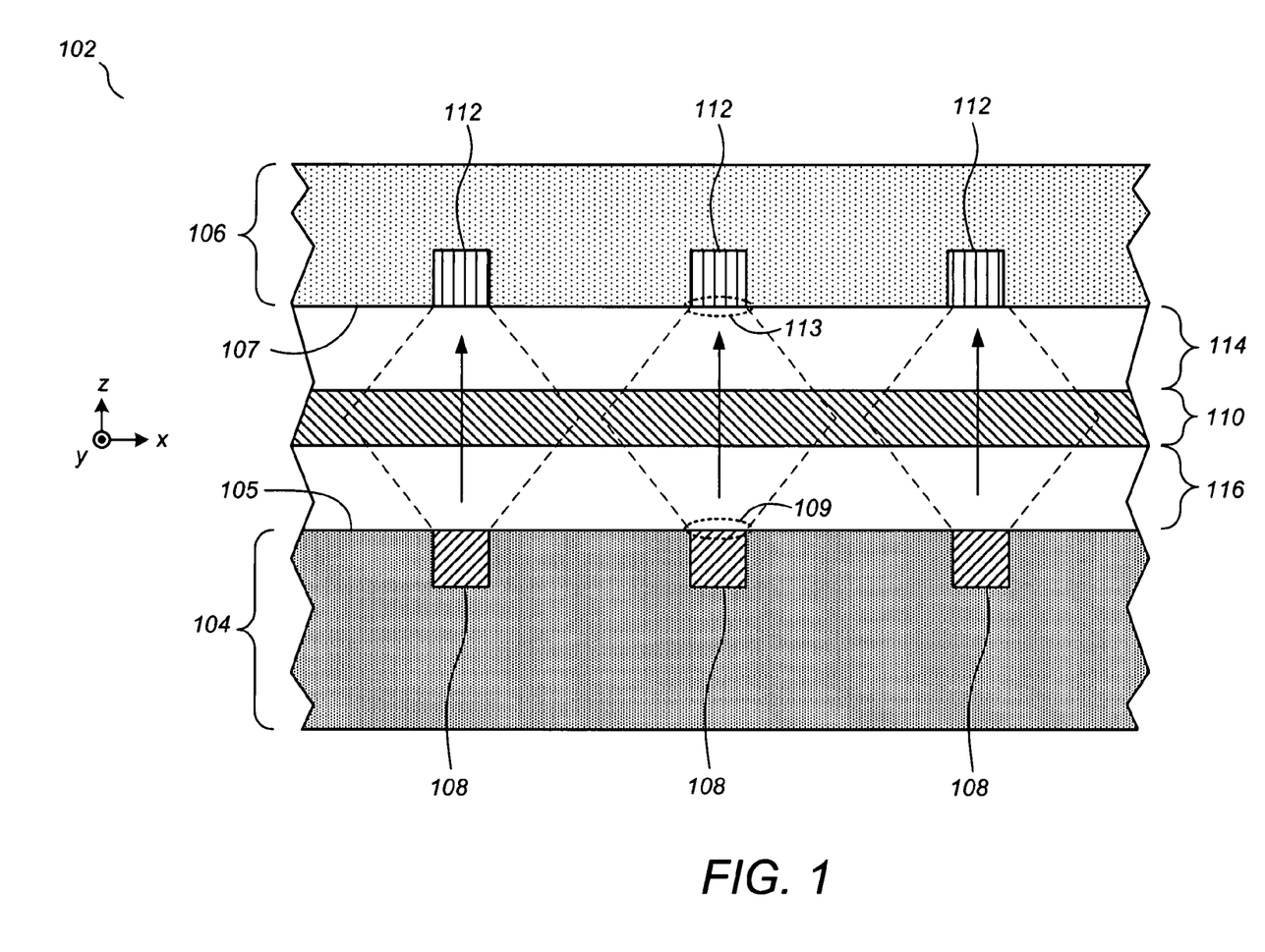
FIG. 1 illustrates a cross-section of an integrated circuit device according to an embodiment.

FIG. 1 illustrates a cross-section of an integrated circuit device 102 according to an embodiment. Integrated circuit device 102 comprises a first integrated circuit layer 104 and a second integrated circuit layer 106. The integrated circuit layers 104 and 106 may be from two different integrated circuit chips that have been glued or bonded together, or may be on a common integrated circuit chip. As used herein, integrated circuit layer refers to a vertically contiguous slab of an integrated circuit chip. It is to be appreciated that an integrated circuit layer, as that term is used herein, may itself comprise a plurality of individual material layers, termed sub-layers herein. Thus, for example, the integrated circuit layers 104 and 106 may each comprise several adjacent sub-layers of differing materials formed, processed, patterned, or otherwise fabricated to achieve various electrical, electrooptical, and/or optical functionalities.

Integrated circuit layer 104 comprises one or more optical emitters 108, each having an emitting aperture 109 where optical signals are emitted. In the embodiment of FIG. 1, the emitting apertures 109 are generally coplanar with an upper surface 105 of the integrated circuit layer 104, the upper surface 105 thereby being a sending surface. In one embodiment, the optical emitters 108 comprise electrically driven optical sources that vertically project optical signals. By electrically driven, it is meant that information encoded into the optical signals arose from an electrical circuit at some point, regardless of the particular modulation method used. In accordance with the advantages of one or more embodiments, the optical emitters 108 can be made very small and very close together, with sizes and inter-center spacings on the order of $\lambda/4$ or smaller, for example, where $\lambda$ is a wavelength of the emitted light. Examples of suitable electrically driven optical sources include, but are not limited to, near-field lasers, silicon nanowire lasers, and zinc oxide nanowire lasers. Suitable values for the emitted wavelength $\lambda$, which is highly source-dependent, range from about 300 nm to 1600 nm. Where a broader optical spectrum is permitted, nanoscale light-emitting diodes (LEDs) may be used. It is to be appreciated, however, that a variety of other known or hereinafter developed optical sources may be used without departing from the scope of the embodiments.

In other embodiments, one or more of the optical emitters 108 may be optically driven. Examples of suitable optically driven sources include, but are not limited to, photonic crystal defect lasers. In still other embodiments, one or more of the optical emitters 108 can comprise a passive transverse optical waveguide (not shown) propagating light along the x-y plane of FIG. 1, with the emitting apertures 109 corresponding to vertical microcoupling locations therealong. Vertical microcoupling location refers to a location at which particular kinds of gratings, 45-degree reflecting structures, or the like are formed into the optical waveguide that cause at least a portion of the optical signal to be vertically projected out of the plane of propagation. The optical signal may be modulated, either electrically or optically, at an optical source coupled to the optical waveguide. Alternatively, the propagating optical signal may be an unmodulated carrier signal that is modulated upon vertical projection, for example, by electrically varying one or more material properties at the vertical microcoupling locations.

Integrated circuit layer 106 comprises one or more optical receivers 112, each having a receiving aperture 113 where optical signals can be received. In the embodiment of FIG. 1, the receiving apertures 113 are generally coplanar with a lower surface 107 of the integrated circuit layer 106, the lower surface 107 thereby being a receiving surface. In one embodiment, the optical receivers 112 comprise optical-to-electrical conversion devices such as silicon photodiodes. In other embodiments, the optical receivers 112 comprise passive waveguides coupled to guide the received light to other locations in the integrated circuit device 102. Amplification, optical-electrical-optical (O-E-O) regeneration, and/or multiplexing may be used to transfer the received signals to other locations in the integrated circuit device 102. In accordance with the advantages of one or more embodiments, the optical receivers 112 can be made very small and very close together, with sizes and inter-center spacings similar to those of the optical emitters 108. Preferably, the optical receivers 112 are in respective vertical alignment with the optical emitters 108.

While several of the embodiments described herein are particularly advantageous when there are dense arrays of optical emitters 108 and optical receivers 112, the scope of the embodiments is not so limited. For example, in other embodiments there may be a single optical emitter 108 and a single optical receiver 112, while in still other embodiments there may be sparse arrays of optical emitters 108 and optical receivers 112, with one or more advantages such as coupling efficiency or reduced optical leakage being provided by each such embodiment.

Integrated circuit device 102 further comprises a superlens element 110 positioned between the upper surface 105 of the first integrated circuit layer 104 and the lower surface 107 of the second integrated circuit layer 106. As used herein, superlens element refers to an imaging device capable of imaging incident light with sub-wavelength resolution. Often referenced by various other names such as perfect lens, negatively refracting lens, composite material lens, flat lens, and metamaterial lens, a superlens element under proper conditions is generally not subject to diffraction limitations associated with positive-index optical lenses, and can therefore image light to a resolution much finer than a wavelength $\lambda$. Generally speaking, resolutions down to $\lambda/10$ or even finer resolutions can be achieved.

Integrated circuit device 102 further comprises spacer layers 114 and 116 positioned between the superlens element 110 and the surfaces 107 and 105, respectively. Depending on the particular geometry and the nature of the optical emitters 108 and optical receivers 112, one or both of the spacer layers 114 and 116 could potentially be omitted. Preferably, the spacer layers 114 and 116 comprise a low-index material such as polymethyl-methacrylate (PMMA) or, where physically permissible, air or a low-index liquid.

According to an embodiment, the superlens element 110 is configured and dimensioned, along with the spacer layers 114 and 116, to image each of the emitting apertures 109 onto its associated receiving aperture 113, as indicated by the dotted lines and arrows in FIG. 1. One or more advantages are provided. For example, crosstalk between the various optical signals is avoided. Also, because the superlens element 110 is not diffraction-limited, the sizes of the optical emitters 108 and optical receivers 112, as well as the lateral distances therebetween, can be made very small, e.g., substantially less than one wavelength, with crosstalk still being avoided. The superlens element 110 facilitates "perfect" real imaging of the emitting apertures 109 onto the receiving apertures 113. Accordingly, the optical emitters 108 and optical receivers 112 can be packed into very dense arrays corresponding, in turn, to ever-shrinking arrangements of local electrical circuits on the integrated circuit device. Moreover, because superlensing elements generally have no optical axis, there are generally no alignment concerns with the superlens element 110, and only the optical emitters 108 and optical receivers 112 require optical aligning in the x-y plane.

In one embodiment, the vertical distance between the emitting and receiving apertures 108 and 112 is less than one wavelength of the emitted light, and each is in the near field relative to the superlensing element 110. For this embodiment, the superlensing element 110 may comprise a thin slab of a highly conductive metal such as silver. As known in the art, in a near-field situation the electric and magnetic responses of materials are decoupled and, therefore, only the permittivity needs to be considered for transverse magnetic (TM) waves. This makes metals such as silver good candidates for optical superlensing, because negative permittivity is readily attainable as a consequence of the collective excitation of conduction electrons. Advantageously, fabrication of a silver-slab superlens element is generally straightforward. By way of example and not by way of limitation, the silver slab may be 35 nm thick, and each of the upper and lower spacer layers 114 and 116 may comprise a 40 nm layer of PMMA.

Fabrication of the integrated circuit device 102 can be achieved using known integrated circuit fabrication methods including, but not limited to: deposition methods such as chemical vapor deposition (CVD), metal-organic CVD (MOCVD), plasma enhanced CVD (PECVD), chemical solution deposition (CSD), sol-gel based CSD, metal-organic decomposition (MOD), Langmuir-Blodgett (LB) techniques, thermal evaporation/molecular beam epitaxy (MBE), sputtering (DC, magnetron, RF), and pulsed laser deposition (PLD); lithographic methods such as optical lithography, extreme ultraviolet (EUV) lithography, x-ray lithography, electron beam lithography, focused ion beam (FIB) lithography, and nanoimprint lithography; removal methods such as wet etching (isotropic, anisotropic), dry etching, reactive ion etching (RIE), ion beam etching (IBE), reactive IBE (RIBE), chemical-assisted IBE (CAIBE), and chemical-mechanical polishing (CMP); modifying methods such as radiative treatment, thermal annealing, ion beam treatment, and mechanical modification; and assembly methods such as wafer bonding, surface mount, and other wiring and bonding methods.

Figure 5:
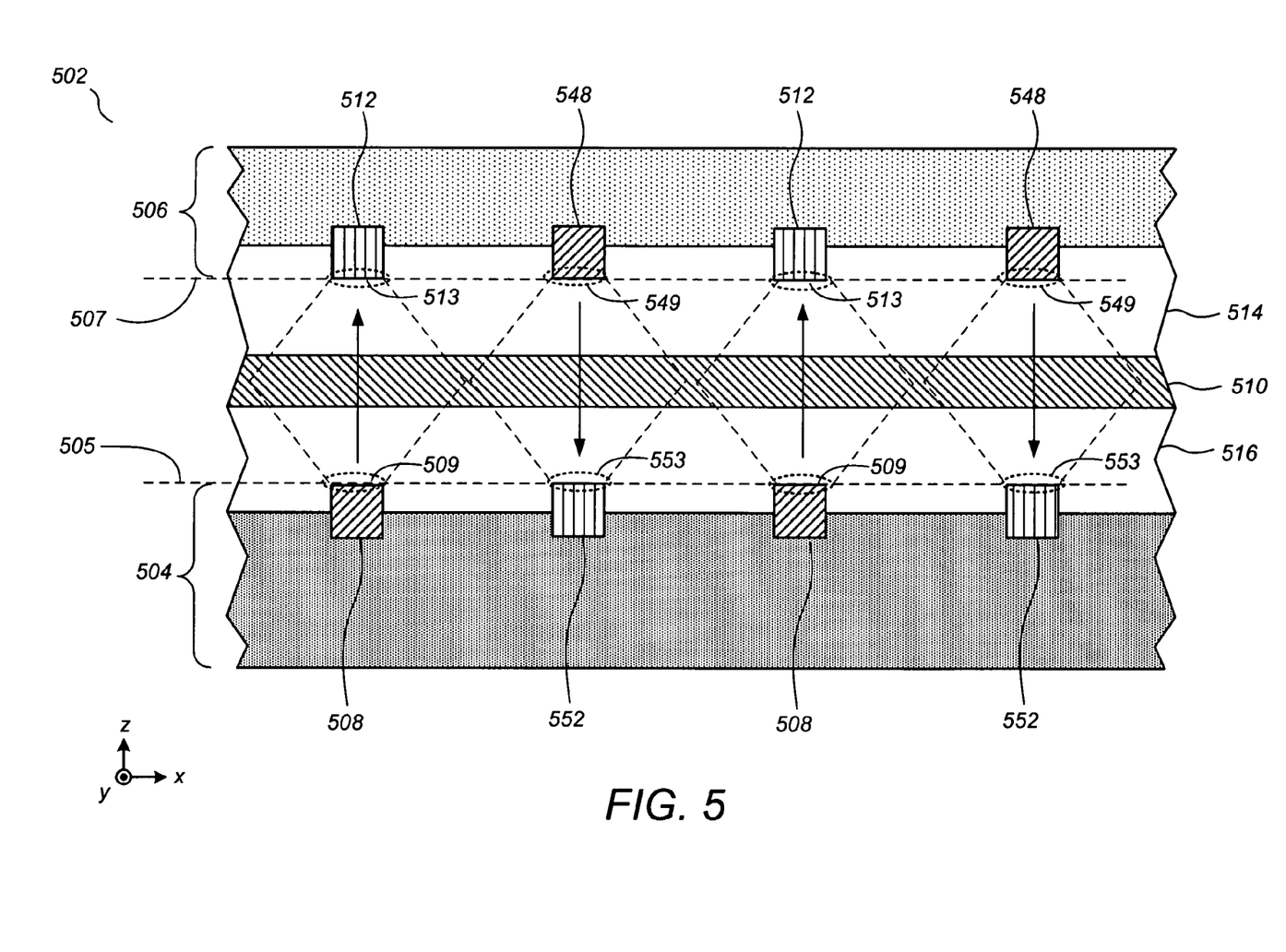
FIG. 5 illustrates a cross-section of an integrated circuit device according to an embodiment.

Notably, the embodiments are not limited to one-directional scenarios in which all emitters are on one integrated circuit layer and all receivers are on the other. Rather, as indicated in the example of FIG. 5, infra, two-way communications between the integrated circuit layers are achieved in other embodiments by placing emitters and receivers on each of the integrated circuit layers. In one advantageous embodiment, each local electrical circuit on a densely-packed first integrated circuit layer is associated with a nearby emitter-receiver (transmit-receive) pair on the first integrated circuit layer, with a corresponding receiver-emitter (receive-transmit) pair being positioned directly thereabove on a second integrated circuit layer. The second integrated circuit layer may comprise an optical interconnect system coupled to each corresponding receiver-emitter (receive-transmit) pair to serve as an "optical local area network" among the various local electrical circuits on the first integrated circuit layer. Many other advantageous configurations are also made possible and are within the scope of the embodiments.

Figure 2:
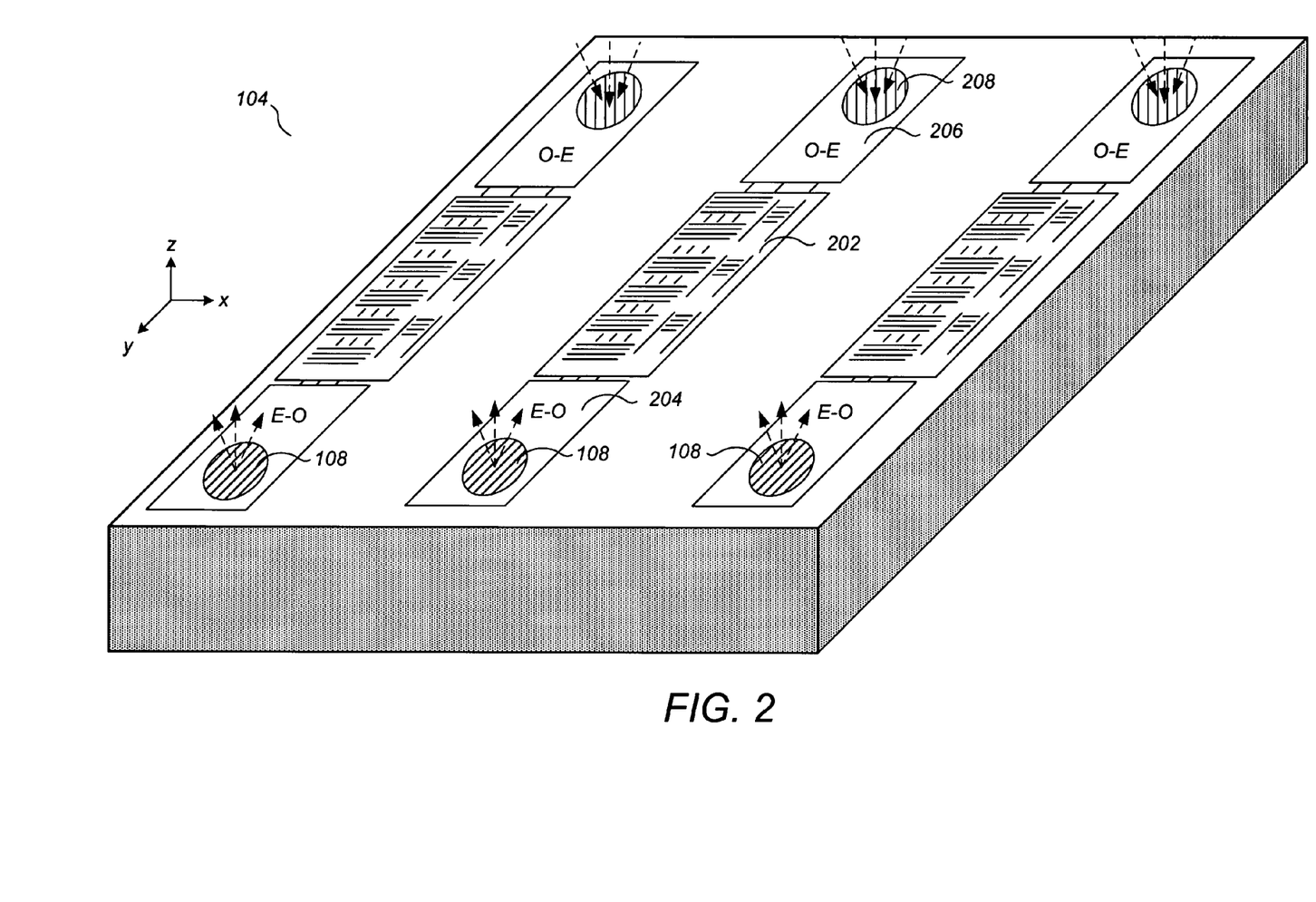
FIG. 2 illustrates a perspective view of a first integrated circuit layer according to an embodiment.

FIG. 2 illustrates a perspective view of the first integrated circuit layer 104 according to an embodiment. The first integrated circuit layer 104 comprises a plurality of local electrical circuits 202, each being coupled to an electrical-to-optical (E-O) conversion circuit 204 driving a corresponding one of the optical emitters 108. Each local electrical circuit 202 is further coupled to an optical-to-electrical (O-E) conversion circuit 206 providing an electrical version of an optically-encoded information signal received at an optical receiver 208. Accordingly, each local electrical circuit 202 is associated with a nearby emitter-receiver (transmit-receive) pair 108/208 for facilitating optical communication with the "outside world", i.e., the other local electrical circuits on the device, which can be hundreds of microns or even several millimeters or centimeters away. Advantageously, the spacings between the local electrical circuits 202 can be made very small without being confounded by issues of coupling the associated optical signals into the second integrated circuit layer 104.

Figure 3:
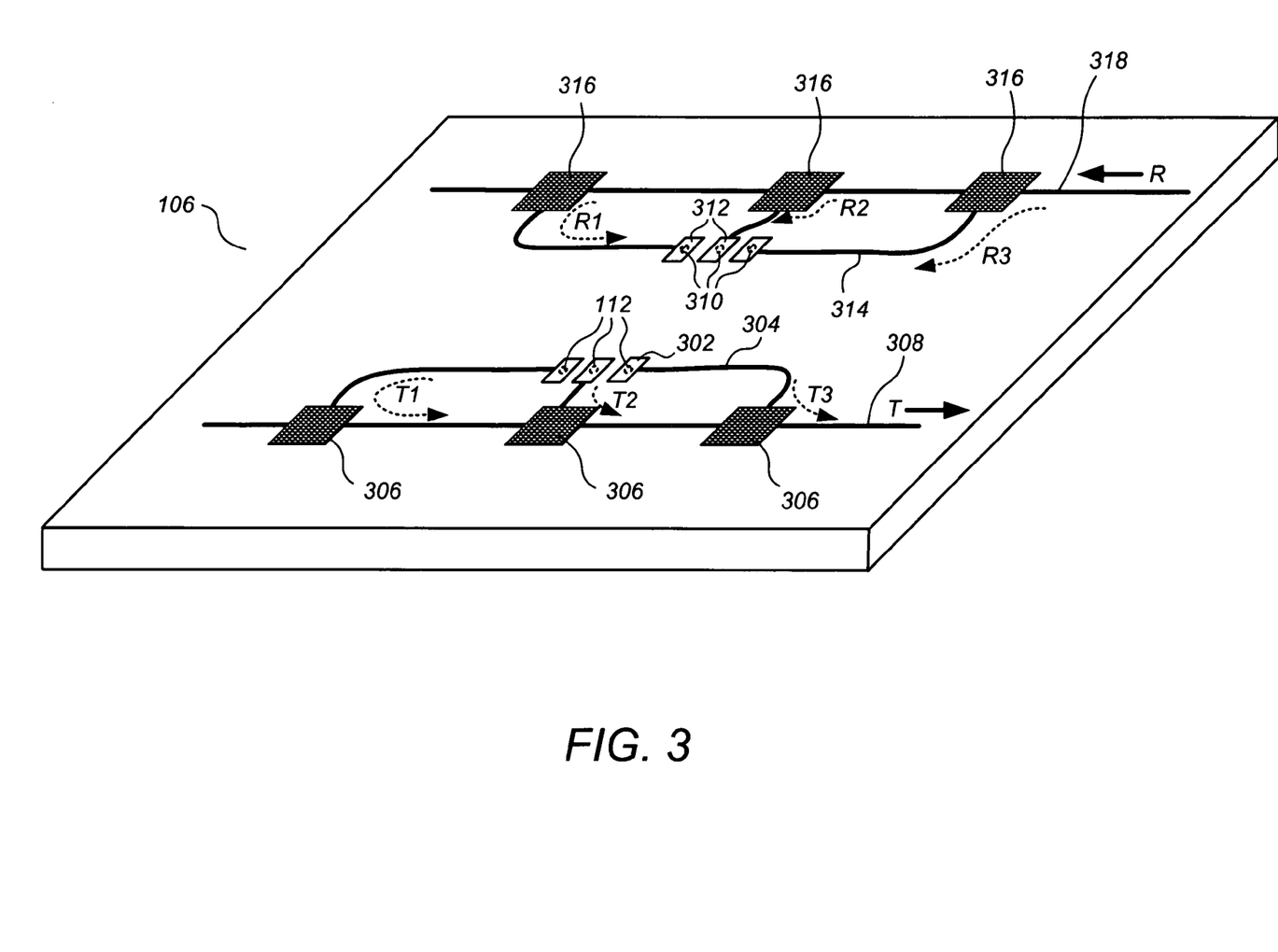
FIG. 3 illustrates a perspective view of a second integrated circuit layer according to an embodiment.

FIG. 3 illustrates a perspective view of the second integrated circuit layer 106 that, in one embodiment, serves as an "optical local area network" among the various local electrical circuits on the first integrated circuit layer 104. For purposes of illustration and not by way of limitation, it is presumed that optical interconnect elements are on the "top" of the integrated circuit layer 106, and that the optical receivers 112 (and optical emitters 310) extend through to the top layer from the bottom layer facing the first integrated circuit layer 104. Associated with each optical receiver 112 is an O-E-O regenerator circuit 302 coupled through a waveguide 304 to an add multiplexer 306. Different optical signals T1, T2, and T3 carrying information provided by the local electrical circuits 202 on first integrated circuit layer 104 are multiplexed onto common signal T transported by an optical bus 308 to "distant" parts of the integrated circuit device.

A plurality of optical emitters 312 is provided for transmitting optical signals to the optical receivers 208 (see FIG. 2, supra) on the first integrated circuit layer 104. The optical emitters are driven by O-E-O regenerator circuits 312 that are coupled through waveguides 314 to a drop multiplexer 316. Different optical signals R1, R2, and R3 are demultiplexed from an optical bus 318 carrying a multiplexed information signal R provided from a "distant" electro-optical circuit. In other embodiments, the optical busses 308 and 318 are combined onto a common optical bus, and the add multiplexers 306 and drop multiplexers 316 are combined into common add-drop multiplexers. One or both of the O-E-O regenerator circuits 302/312 may be omitted if allowed by distances and signal strengths. More generally, any of a variety of different intra-device optical communications schemes can be used without departing from the scope of the embodiments. In one embodiment, an optical communication scheme described in U.S. 2005/0078902 A1, supra, is used for information exchange among different regions of local electrical circuits on the integrated circuit device 102.

Figure 4:
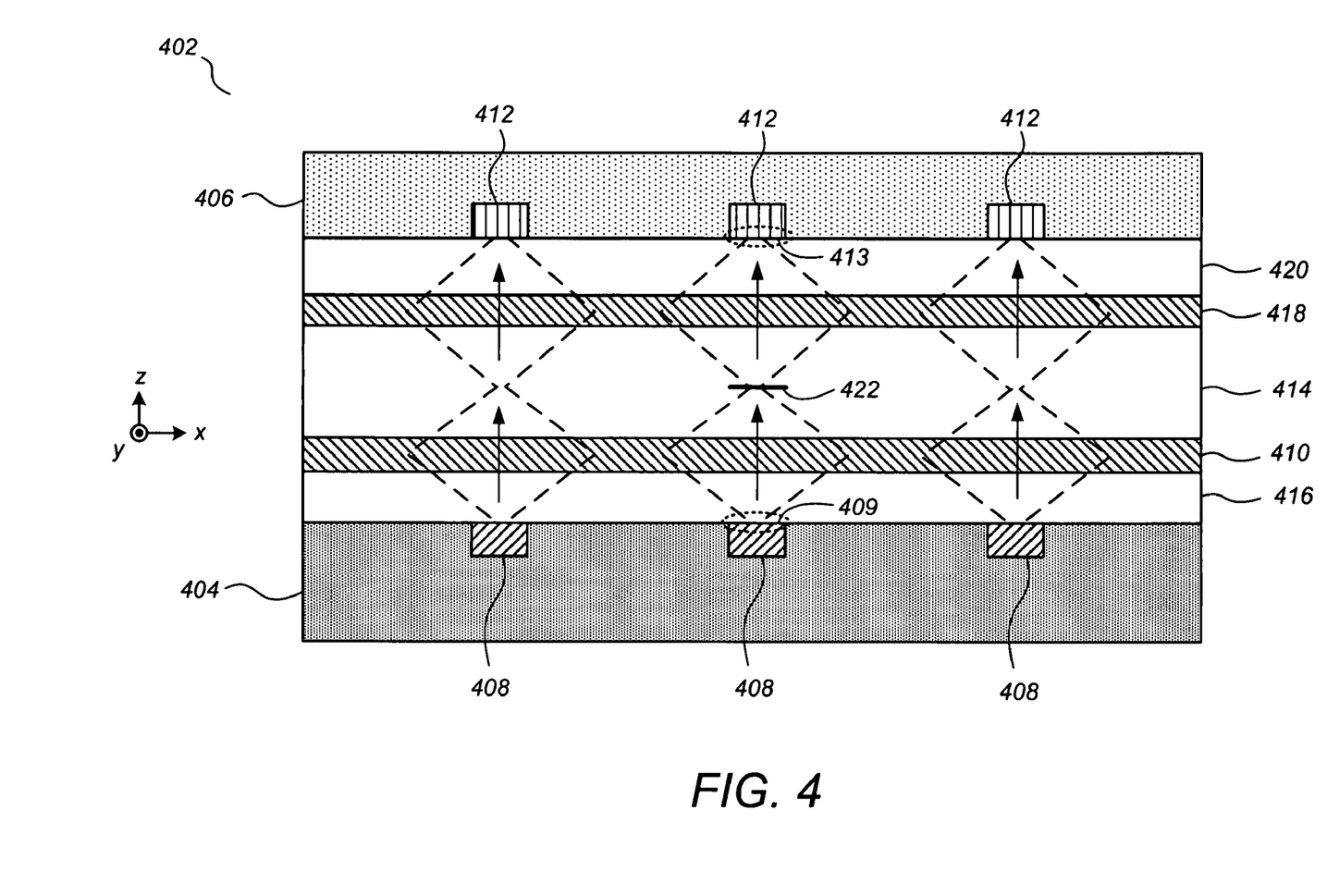
FIG. 4 illustrates a cross-section of an integrated circuit device according to an embodiment.

FIG. 4 illustrates a cross-section of an integrated circuit device 402 according to an embodiment, comprising a first integrated circuit layer 404, a second integrated circuit layer 406, a plurality of optical emitters 408 having emitting apertures 409, a plurality of optical receivers 412 having receiving apertures 413, and a superlens element 410 in a manner similar to FIG. 1, supra. However, also included in the integrated circuit device 402 is a second superlens element 418, a wider spacer layer 414, and an additional spacer layer 420. Where the facing surfaces of the integrated circuit layers 404 and 406 are separated by more than a wavelength, multiple superlens elements may be used to preserve a near-field imaging scenario such that silver superlenses, which are relatively easy to fabricate, can be used. In operation, the first superlens element 410 forms a real image 422 of each emitting aperture 409, and then that real image 422 is re-imaged through the second superlens element 418 and onto the corresponding receiving aperture 413. In other embodiments, three or more silver superlenses are used as necessary to bridge across the gap between the sending apertures 409 and receiving apertures 413. Thus, provided is a series of superlensing elements configured and positioned such that a real image of the emitting aperture formed by each prior superlensing element is re-formed through each subsequent superlensing element and onto the receiving aperture.

FIG. 5 illustrates a cross-section of an integrated circuit device 502 according to an embodiment, comprising a first integrated circuit layer 504, a second integrated circuit layer 506, a first plurality of optical emitters 508, a first plurality of optical receivers 512, a superlens element 510, and spacer layers 514 and 516. Integrated circuit device 502 is similar to that of FIG. 1., supra, with an exception that a second plurality of optical emitters 548 is provided on the second integrated circuit layer 506 and a second plurality of optical receivers 552 is provided on the first integrated circuit layer 504. The optical emitters 548 are spatially interleaved with the optical receivers 512 and the optical receivers 552 are spatially interleaved with the optical emitters 508. In addition to providing two-way communications between the integrated circuit layers 504 and 506, further robustness against crosstalk is provided by effectively doubling the distance between receiving apertures.

Optical emitters 508 and 548 each comprise sending apertures 509 and 553, while optical receivers 512 and 552 each comprise receiving apertures 513 and 553. In the embodiment of FIG. 5, the optical emitters 508 and optical receivers 552, which are components of the first integrated circuit layer 504, extend outward from the bulk thereof, which may be necessary or convenient when nanowire-based devices are used. The associated sending and receiving apertures 509 and 553 extend into the spacer layer 516, forming sending and receiving surfaces at a plane 505 for the first integrated circuit layer 504. The optical emitters 548 and optical receivers 512, which are components of the second integrated circuit layer 506, have associated sending and receiving apertures 549 and 513 extending outward into the spacer layer 514, forming sending and receiving surfaces at a plane 507 for the second integrated circuit layer 506. Thus, as illustrated in FIG. 5, a sending and/or receiving surface of an integrated circuit layer need not be in the same plane as a "bulk" surface of that integrated circuit layer, as is the case with the embodiment of FIG. 1, supra.

Whereas many alterations and modifications of the embodiments will no doubt become apparent to a person of ordinary skill in the art after having read the foregoing description, it is to be understood that the particular embodiments shown and described by way of illustration are in no way intended to be considered limiting. By way of example, while in one or more the above embodiments the array of optical emitters are presumed to emit light at the same wavelength, in other embodiments they may emit light at different wavelengths ranging between a lower wavelength and an upper wavelength. In such case, the array of optical emitters may be spaced apart by less than the lower wavelength, and the array of receiving apertures may be spaced apart by less than the lower wavelength with minimal crosstalk due to "perfect" imaging of the emitting apertures thereon by the superlensing element. By way of further example, although dense one-dimensional arrays of emitting and receiving apertures are described in one or more embodiments above, dense two-dimensional arrays of emitting and receiving apertures are provided in other embodiments. Thus, reference to the details of the described embodiments are not intended to limit their scope.

What is claimed is:

1. In an optoelectronic integrated circuit device comprising a vertical arrangement of integrated circuit layers, a method for coupling an optical signal between a first integrated circuit layer having a first surface including an emitting aperture thereof and a second integrated circuit layer having a second surface facing said first surface, said second surface including a receiving aperture thereof, comprising projecting the optical signal emitted at the emitting aperture is imaged onto the receiving aperture through a superlensing element positioned between the first and second integrated circuit layers such that the optical signal emitted at the emitting aperture is imaged onto the receiving aperture, wherein said superlensing element comprises a highly conductive metal film exhibiting a negative permittivity at a wavelength of said optical signal.

2. The method of claim 1, wherein said superlensing element exhibits at least one of a negative effective permeability and a negative effective permittivity at a wavelength of the optical signal.

3. The method of claim 1, the optical signal comprising a first wavelength and being emitted from a sending surface of the first integrated circuit layer, the optical signal being received at a receiving surface of the second integrated circuit layer that is generally parallel to said sending surface, wherein said sending and receiving surfaces are separated by less than said first wavelength.

4. The method of claim 3, wherein said optical signal is emitted from an electrically driven optical source associated with said first integrated circuit layer.

5. The method of claim 3, wherein said optical signal is emitted at a vertical microcoupling location of a passive transverse optical waveguide in said first integrated circuit layer.

6. The method of claim 3, wherein said optical signal is emitted from an emitting aperture on said sending surface and received at a receiving aperture on said receiving surface, wherein said superlensing element is separated from said sending and receiving surfaces by first and second spacing layers, respectively, and wherein said first and second spacing layers are dimensioned such that a real image of said emitting aperture is formed at said receiving aperture at said receiving surface.

7. The method of claim 1, said optical signal being emitted from an emitting aperture on a sending surface of said first integrated circuit layer and received at a receiving aperture on a receiving surface of said second integrated circuit layer, further comprising projecting the optical signal through at least one additional superlensing element positioned such that a real image of the emitting aperture formed by each superlensing element is re-formed through subsequent superlensing elements and onto said receiving aperture of said receiving surface.

8. The method of claim 1, said optical signal being a first optical signal, further comprising projecting a first plurality of optical signals including said first optical signal from said first integrated circuit layer to said second integrated circuit layer through said superlensing element, said first plurality of optical signals being sent from a first array of emitting apertures on a surface of said first integrated circuit layer to a corresponding first array of receiving apertures on a facing surface of said second integrated circuit layer.

9. The method of claim 8, the plurality of optical signals having wavelengths ranging between a lower wavelength and an upper wavelength, said first array of emitting apertures being spaced apart by less than said lower wavelength, said first array of receiving apertures being spaced apart by less than said lower wavelength, said first array of receiving apertures receiving said plurality of optical signals with minimal crosstalk due to imaging of said first array of emitting apertures thereon by said superlensing element.

10. The method of claim 9, further comprising projecting a second plurality of optical signals from said second integrated circuit layer to said first integrated circuit layer through said superlensing element, said second plurality of optical signals being sent from a second array of emitting apertures on said surface of said second integrated circuit layer to a corresponding second array of receiving apertures on said surface of said first integrated circuit layer.

11. The method of claim 10, wherein said first array of emitting apertures and said second array of receiving apertures are spatially interleaved on said surface of said first integrated circuit layer, and wherein said second array of emitting apertures and said first array of receiving apertures are correspondingly positioned on said surface of said second integrated circuit layer.

12. An integrated circuit device, comprising:
a first integrated circuit layer having a first surface including an emitting aperture;

a second integrated circuit layer having a second surface facing said first surface, said second surface including a receiving aperture; and a superlensing element positioned between said first and second surfaces such that an optical signal emitted at the emitting aperture is imaged onto the receiving aperture, wherein said superlensing element comprises a highly conductive metal film exhibiting a negative permittivity at a wavelength of said optical signal.

13. The integrated circuit device of claim 12, wherein said superlensing element exhibits at least one of a negative effective permeability and a negative effective permittivity at a wavelength of the optical signal.

14. The integrated circuit device of claim 12, wherein said first and second surfaces are separated by a distance that is less than a wavelength of the optical signal.

15. The integrated circuit device of claim 12, wherein said emitting aperture is associated with one of (a) an electrically driven optical source associated with said first integrated circuit layer, and (b) a vertical microcoupling location of a passive transverse optical waveguide in said first integrated circuit layer.

16. The integrated circuit device of claim 12, wherein said superlensing element is positioned and dimensioned such that a real image of the emitting aperture is formed at the receiving aperture.

17. The integrated circuit device of claim 12, wherein said superlensing element is separated from each of said first and second surfaces by air or a low-index material.

18. The integrated circuit device of claim 12, further comprising at least one additional superlensing element to form a series of superlensing elements positioned between said first and second layers, said series of superlensing elements being configured and positioned such that a real image of the emitting aperture formed by each prior superlensing element is re-formed through each subsequent superlensing element and onto said receiving aperture.

19. The integrated circuit device of claim 12, said emitting aperture being a first emitting aperture, said receiving aperture being a first receiving aperture, further comprising:

a first plurality of emitting apertures on said first surface including said first emitting aperture, said first plurality of emitting apertures emitting a first plurality of optical signals, said first plurality of emitting apertures being spaced apart by less than a minimum wavelength of the optical signals; and a corresponding first plurality of receiving apertures on said second surface including said first receiving aperture, said first plurality of receiving apertures being spaced apart by less than said minimum wavelength;

wherein said first plurality of receiving apertures receives said first plurality of optical signals with minimal crosstalk due to imaging of said first plurality of emitting apertures thereon by said superlensing element.

20. The integrated circuit device of claim 19, wherein said first integrated circuit layer comprises a plurality of local electrical circuits associated respectively with said plurality of emitting apertures, each local electrical circuit providing information modulated onto the optical signal emitted by the associated emitting aperture for transmission to a distant electrooptical circuit of said integrated circuit device, and wherein said second integrated circuit layer comprises an optical bus coupled to said plurality of receiving apertures for transporting said information to the distant electrooptical circuit.

21. The integrated circuit device of claim 20, wherein said optical bus is coupled to said receiving apertures through integrated optical add-drop multiplexer circuits and optical-electrical-optical regenerating circuits.

22. The integrated circuit device of claim 20, further comprising:

a second plurality of emitting apertures on said second surface emitting a second plurality of optical signals corresponding to information optically transported from the distant electrooptical circuit by said optical bus;

a second plurality of receiving apertures on said first surface corresponding respectively to said second plurality of emitting apertures and to said plurality of local electrical circuits on said first integrated circuit layer; and for each of said second plurality of receiving apertures, an optical-to-electrical conversion circuit for converting the optically transported information into an electrical signal for distribution to the corresponding local electrical circuit.

23. An integrated circuit device, comprising:

a first integrated circuit layer having a first surface including an emitting aperture;

a second integrated circuit layer having a second surface facing said first surface, said second surface including a receiving aperture, wherein said first and second surfaces are separated by a distance that is less than a wavelength of an optical signal; and a superlensing element positioned between said first and second surfaces such that the optical signal emitted at the emitting aperture is imaged onto the receiving aperture.

24. The integrated circuit device of claim 23, wherein said superlensing element comprises a highly conductive metal film exhibiting a negative permittivity at a wavelength of said optical signal.

25. The integrated circuit device of claim 23, wherein said superlensing element comprises at least one of a negative effective permeability and a negative effective permittivity at a wavelength of the optical signal.

26. The integrated circuit device of claim 23, wherein said emitting aperture is associated with one of (a) an electrically driven optical source associated with said first integrated circuit layer, and (b) a vertical microcoupling location of a passive transverse optical waveguide in said first integrated circuit layer.

27. The integrated circuit device of claim 23, wherein said superlensing element is positioned and dimensioned such that a real image of the emitting aperture is formed at the receiving aperture.

28. In an optoelectronic integrated circuit device comprising a vertical arrangement of integrated circuit layers, a method for coupling an optical signal between a first integrated circuit layer having a first surface including an emitting aperture thereof and a second integrated circuit layer having a second surface facing said first surface, said second surface including a receiving aperture thereof wherein said first and second surfaces are separated by a distance that is less than a wavelength of the optical signal, comprising projecting the optical signal emitted at the emitting aperture is imaged onto the receiving aperture through a superlensing element positioned between the first and second integrated circuit layers such that the optical signal emitted at the emitting aperture is imaged onto the receiving aperture.

29. The method of claim 28, wherein said superlensing element comprises a highly conductive metal film exhibiting a negative permittivity at a wavelength of said optical signal.

30. The method of claim 28, wherein said superlensing element exhibits at least one of a negative effective permeability and a negative effective permittivity at a wavelength of the optical signal.

31. The method of claim 28, the optical signal comprising a first wavelength and being emitted from a sending surface of the first integrated circuit layer, the optical signal being received at a receiving surface of the second integrated circuit layer that is generally parallel to said sending surface.

32. The method of claim 31, wherein said optical signal is emitted from an emitting aperture on said sending surface and received at a receiving aperture on said receiving surface, wherein said superlensing element is separated from said sending and receiving surfaces by first and second spacing layers, respectively, and wherein said first and second spacing layers are dimensioned such that a real image of said emitting aperture is formed at said receiving aperture at said receiving surface.

33. The method of claim 28, said optical signal being emitted from an emitting aperture on a sending surface of said first integrated circuit layer and received at a receiving aperture on a receiving surface of said second integrated circuit layer, further comprising projecting the optical signal through at least one additional superlensing element positioned such that a real image of the emitting aperture formed by each superlensing element is re-formed through subsequent superlensing elements and onto said receiving aperture of said receiving surface.

34. The method of claim 28, said optical signal being a first optical signal, further comprising projecting a first plurality of optical signals including said first optical signal from said first integrated circuit layer to said second integrated circuit layer through said superlensing element, said first plurality of optical signals being sent from a first array of emitting apertures on a surface of said first integrated circuit layer to a corresponding first array of receiving apertures on a facing surface of said second integrated circuit layer.

35. The method of claim 28, the plurality of optical signals having wavelengths ranging between a lower wavelength and an upper wavelength, said first array of emitting apertures being spaced apart by less than said lower wavelength, said first array of receiving apertures being spaced apart by less than said lower wavelength, said first array of receiving apertures receiving said plurality of optical signals with minimal crosstalk due to imaging of said first array of emitting apertures thereon by said superlensing element.

36. The method of claim 35, further comprising projecting a second plurality of optical signals from said second integrated circuit layer to said first integrated circuit layer through said superlensing element, said second plurality of optical signals being sent from a second array of emitting apertures on said surface of said second integrated circuit layer to a corresponding second array of receiving apertures on said surface of said first integrated circuit layer.

37. The method of claim 36, wherein said first array of emitting apertures and said second array of receiving apertures are spatially interleaved on said surface of said first integrated circuit layer, and wherein said second array of emitting apertures and said first array of receiving apertures are correspondingly positioned on said surface of said second integrated circuit layer.

* * * * *

UNITED STATES PATENT AND TRADEMARK OFFICE
CERTIFICATE OF CORRECTION

PATENT NO. : 7,783,140 B2  Page 1 of 1
APPLICATION NO. : 11/148583
DATED : August 24, 2010
INVENTOR(S) : Shih-Yuan Wang It is certified that error appears in the above-identified patent and that said Letters Patent is hereby corrected as shown below:

In column 9, line 36, in Claim 18, delete "clement" and insert -- element --, therefor.

Signed and Sealed this
Twenty-sixth Day of April, 2011

David J. Kappos
*Director of the United States Patent and Trademark Office*